United States Patent Office 2,698,858
Patented Jan. 4, 1955

2,698,858
MERCURY COMPOUNDS

Calvert W. Whitehead, Indianapolis, Ind., assignor to Eli Lilly and Company, Indianapolis, Ind., a corporation of Indiana No Drawing. Application September 1, 1953,
Serial No. 377,958

7 Claims. (Cl. 260—434)

My invention relates to mercurated organic compounds and more particularly to o-[N-2-(β-substituted ethoxy)-3-hydroxymercuripropylcarbamyl]-phenoxyacetic anhydro-acids and their salts.

This application is a continuation-in-part of my copending application, Serial No. 274,285, filed February 29, 1952.

The new phenoxyacetic anhydro-acids of my invention are represented by the formula

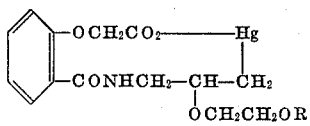

wherein R is hydrogen or a lower alkyl radical having from 1 to 6 carbon atoms.

The o-[N-2-(β-substituted-ethoxy)-3-hydroxymercuripropylcarbamyl]-phenoxyacetic anhydro-acids are in general white crystalline solids which are insoluble in water and are only slightly soluble in most organic solvents. Because of the presence in the molecule of a potential carboxylic acid group, the compounds form salts with basic substances. The alkali metal and ammonium salts of the acids are white solids which are soluble in water. Illustratively, the formula of the sodium salt of the anhydro-acids represented by the preceding formula can be represented as follows:

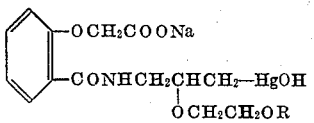

wherein R has the same significance as before.

The new compounds are prepared by reacting a solution of o-allylcarbamylphenoxyacetic acid in ethylene glycol or in an appropriately ether-substituted ethylene glycol with a mercury salt, such as mercuric acetate, or mercuric oxide. Upon standing, the mercurated anhydro-acid precipitates from the reaction mixture in the form of crystals which are separated as by filtration or the like.

The novel salts of the new compounds are prepared from the corresponding anhydro-acids, by the interreaction of molecularly equivalent amounts of the selected anhydro-acid and base. Thus, the alkali metal salts are prepared by reacting the desired anhydro-acid with an equivalent amount of alkali metal carbonate, hydroxide, or alcoholate, for example, sodium carbonate, sodium hydroxide, potassium hydroxide, sodium methylate, potassium ethylate and the like. The ammonium and substituted ammonium salts of the anhydro-acids are prepared by reacting the selected compound with an equivalent amount of ammonium hydroxide or aqueous amine solution, respectively. Salts with other bases are similarly prepared. While salts with any desired basic salt-forming group can be prepared, the preferred salts of the novel substituted hydroxymercuripropylcarbamyl phenoxyacetic anhydro-acids of this invention are the pharmaceutically useful salts. By the term "pharmaceutically useful" it is intended to designate those salts which are not substantially more toxic than the anhydro-acids from which they are derived, and which are compatible with various pharmaceutical extending media or solvents with which they may be compounded for therapeutic purposes.

The following examples more specifically illustrate the preparation of my new compounds.

EXAMPLE 1

Preparation of o-[N-2-(β-methoxyethoxy)-3-hydroxymercuripropylcarbamyl]-phenoxyacetic anhydro-acid 46 g. (0.2 mol) of o-(N-allylcarbamyl)-phenoxyacetic acid are mixed with 200 cc. of dry methyl Cellosolve and heated to 70–80° C. 50 g. (0.23 mol) of red mercuric oxide are added, and the mixture is stirred vigorously until the solids are substantially all dissolved. The resulting solution is filtered and allowed to stand at room temperature for about 3 days during which time a crystalline precipitate consisting of o-[N-2-(β-methoxyethoxy)-3-hydroxymercuripropylcarbamyl]-phenoxyacetic anhydro-acid separates. The precipitate is filtered off, recrystallized from methyl Cellosolve, and dried. o-[N-2-(β-methoxyethoxy)-3-hydroxymercuripropylcarbamyl]-phenoxyacetic anhydro-acid thus obtained contains 1 molecule of methyl Cellosolve of crystallization and melts at about 74° C.

Recrystallization from ethanol-ether yields unsolvated o-[N-2-(β-methoxyethoxy)-3-hydroxymercuripropylcarbamyl]-phenoxyacetic anhydro-acid melting at 135° C.

Analysis.—Calculated for $C_{15}H_{19}NO_6Hg$: Hg=39.30. Found: Hg=39.21.

EXAMPLE 2

Preparation of o-[N-2-(β-ethoxyethoxy)-3-hydroxymercuripropylcarbamyl]-phenoxyacetic anhydro-acid 235 g. (1 mol) of o-(N-allylcarbamyl)-phenoxyacetic acid are added to 1 liter of dry Cellosolve, and heated to 80° C. To the mixture are added with stirring 216.6 g. (1 mol) of red mercuric oxide. 0.3 cc. of glacial acetic acid are added and the mixture is stirred for 1 hour. On cooling there separates a crystalline, white precipitate consisting of o-[N-2-(β-ethoxy-ethoxy)-3-hydroxymercuripropylcarbamyl]-phenoxyacetic anhydro-acid. The precipitate is filtered off through hardened filter paper, and recrystallized from dimethylformamide.

o-[N-2-(β-ethoxyethoxy)-3-hydroxymercuripropylcarbamyl]-phenoxyacetic anhydro-acid thus obtained melted at about 141° C.

EXAMPLE 3

Preparation of o-[N-2-(β-hydroxyethoxy)-3-hydroxymercuripropylcarbamyl]-phenoxyacetic anhydro-acid 235 g. (1 mol) of o-(N-alkylcarbamyl)-phenoxyacetic acid are mixed with 1 liter of ethylene glycol, 318 g. (1 mol) of mercuric acetate are added, and the mixture is stirred until the solids dissolve. The resulting solution is allowed to stand at room temperature for about 3 days during which time a crystalline precipitate consisting of o-[N-2-(β-hydroxyethoxy)-3-hydroxymercuripropylcarbamyl]-phenoxyacetic anhydro-acid separates. The precipitate is filtered off, washed thoroughly with ethanol, and dried. 433 g. of o-[N-2-(β-hydroxyethoxy)-3-hydroxymercuripropylcarbamyl]-phenoxyacetic anhydro-acid are thus obtained. A sample of the substance when heated decomposes at about 200–202° C.

Analysis.—Calculated for $C_{14}H_{17}NO_6Hg$: Hg=40.35. Found: Hg=40.50.

EXAMPLE 4

Preparation of sodium o-[N-2-(β-hydroxyethoxy)-3-hydroxymercuripropylcarbamyl]-phenoxyacetate 257 g. (0.5 mol) of o-[N-2-(β-hydroxyethoxy)-3-hydroxymercuripropylcarbamyl]-phenoxyacetic anhydro-acid are dissolved in 1 liter of 0.5 M sodium bicarbonate solution. The solution is evaporated to dryness, leaving as a white solid the sodium salt of o-[N-2-(β-hydroxyethoxy)-3-hydroxymercuripropylcarbamyl]-phenoxyacetic acid.

Analysis.—Calculated for $C_{14}H_{16}NO_6HgNa$: Hg=37.32. Found: Hg=36.96.

EXAMPLE 5

*Preparation of o - [N - 2 - (β - butoxyethoxy) - 3 - hydroxymercuripropylcarbamyl]-phenoxyacetic anhydroacid*

235 g. (1 mol) of o-(N-allylcarbamyl)-phenoxyacetic acid are added to 1 liter of dry butyl Cellosolve, and the mixture is heated to 80° C., with stirring. 216.6 g. (1 mol) of red mercuric oxide are added, followed by 0.3 cc. of glacial acetic acid. The mixture is stirred for about 1 hour, and filtered hot. On cooling, a white crystalline precipitate consisting of o-[N-2-(β-butoxyethoxy) - 3 - hydroxymercuripropylcarbamyl] - phenoxyacetic anhydro-acid separates. The precipitate is filtered off through hardened filter paper, and recrystallized from alcohol-ether.

o - [N - 2 -(β - butoxyethoxy) - 3 - hydroxymercuripropylcarbamyl]-phenoxyacetic anhydro-acid thus prepared melted at about 132–133° C.

*Analysis.*—Calculated for $C_{16}H_{25}NO_6Hg$: $Hg=37.23$. Found: $Hg=37.45$.

EXAMPLE 6

*Preparation of o - [N - 2 - (β - 2' - ethylbutoxyethoxy)- 3 - hydroxymercuripropylcarbamyl] - phenoxyacetic anhydro-acid*

A solution of 46 g. of o-N-allylcarbamylphenoxyacetic acid in 200 cc. of 2-ethylbutyl Cellosolve was heated to about 70–80° C. and 50 g. of red mercuric oxide were added with vigorous stirring. Stirring and heating were contined for about 3 hours, and the resulting solution was filtered and cooled whereupon a precipitate comprising o - [N - 2 - (β - 2' - ethylbutoxyethoxy) - 3-hydromercuripropylcarbamyl] - phenoxyacetic anhydroacid formed. Dry ether was added to the mixture and the precipitate was filtered off and dried. The dried solid was then dissolved in a minimum amount of warm ethanol and ether was added to the point of incipient crystallization. On standing in the refrigerator a while crystalline product was obtained, which was removed by filtration and dried.

o - [N - 2 - (β - 2' - ethylbutoxyethoxy) - 3 - hydroxymercuripropylcarbamyl] - phenoxyacetic anhydro - acid thus prepared melted at about 124° C.

*Analysis.*—Calculated for $C_{20}H_{29}NO_6Hg$: $Hg=34.6$. Found: $Hg=33.14$.

EXAMPLE 7

*Preparation of sodium o - [N - 2 - (β - methoxyethoxy)- 3 - hydroxymercuripropylcarbamyl] - phenoxyacetate*

264 g. (0.5 mol) of o-[N-2-(β-methoxyethoxy)-3-hydroxymercuripropylcarbamyl]-phenoxyacetic anhydroacid are dissolved in 1 liter of 0.5 M sodium bicarbonate solution. The solution is evaporated to dryness, leaving as a white solid the sodium salt of o-[N-2-(β-methoxyethoxy) - 3 - hydroxymercuripropylcarbamyl]-phenoxyacetic acid.

EXAMPLE 8

*Preparation of ammonium o - [N - 2 - (β - ethoxyethoxy) - 3 - hydroxymercuripropylcarbamyl] - phenoxyacetate*

271 g. (0.5 mol) of o - [N - 2 - (β - ethoxyethoxy)- 3-hydroxymercuripropylcarbamyl] - phenoxyacetic anhydro-acid are dissolved in 700 cc. of 2.5 percent ammonium hydroxide solution. The solution is evaporated to dryness whereupon the ammonium salt of o-[N-2-(β-ethoxyethoxy) - 3 - hydroxymercuripropylcarbamyl]-phenoxyacetic acid is obtained.

The ethanolamine salt of o - [N - 2 - (β - ethoxyethoxy) - 3 - hydroxymercuripropylcarbamyl] - phenoxyacetic anhydro-acid is prepared in the same manner as above, using an aqueous solution of ethanolamine.

EXAMPLE 9

*Preparation of potassium o - [N - 2 - (β - methoxyethoxy) - 3 - hydroxymercuripropylcarbamyl] - phenoxyacetate*

The potassium salt of o - [N - 2 - (β - methoxyethoxy) - 3 - hydroxymercuripropylcarbamyl] - phenoxyacetic anhydro-acid is prepared in the same manner as set out in Example 3 for the sodium salt, except that 1 liter of 0.5 M potassium hydroxide solution is used. Upon evaporation of the solution, a white solid consisting of the potassium salt of o-[N-2-(β-methoxyethoxy) - 3 - hydroxymercuripropylcarbamyl] - phenoxyacetic acid is recovered.

My novel compounds are effective diuretic agents. For therapeutic application the salts desirably are used because of their ready water solubility, and the salt selected is employed in aqueous solution in a concentration of about 5 to 20 percent (w./v.). Preferably an amount of theophyllin, or salt thereof, is incorporated in the aqueous solution in the amount of about 5 to 10 percent (w./v.) of the aqueous solution to enhance the diuretic effect. The addition of a local anesthetic to the solution, for example procaine in amount of from about 1 to 5 percent, appears to reduce undesirable side effects.

Illustrative compositions embodying certain of my novel compounds and adapted for parenteral administration are as follows:

A. A solution of the sodium salt of o-[N-2-(β-methoxyethoxy) - mercuripropylcarbamyl] - phenoxyacetic acid is prepared in accordance with the following:

Sodium o-[N-2-(β-methoxyethoxy)-3-hydroxymercuripropylcarbamyl]-phenoxyacetate _____g__ 10
Water, q. s_____cc__ 200

The solution is sterilized by filtration through a sterilized filter and placed in sealed ampoules. The sterile solution, injected intramuscularly in the amount of about 1 cc., produces a pronounced diuresis.

B. A solution for parenteral administration containing o - [N - 2 - (β - methoxyethoxy) - 3 - hydroxymercuripropylcarbamyl]-phenoxyacetic acid as its sodium salt, theophyllin, and procaine is prepared in accordance with the following:

o - [N - 2 - (β - methoxyethoxy) - 3 - hydroxymercuripropylcarbamyl] - phenoxyacetic anhydroacid _____g__ 10
Theophyllin _____g__ 5.0
Procaine _____g__ 4.0
Water, q. s_____cc__ 100

Sufficient dilute aqueous sodium hydroxide is added to bring the pH to about 7.0.

The solution is placed in ampoules after sterilizing by filtration in the usual way. About 1 cc. of the solution injected subcutaneously produces effective diuresis, without pain or local irritation of the tissues.

C. A solution for parenteral administration containing o - [N - 2 - (β - methoxyethoxy) - 3 - hydroxymercuripropylcarbamyl]-phenoxyacetic acid in salt form, and theophyllin ethylenediamine is prepared in accordance with the following:

o - [N - 2 - (β - methoxyethoxy) - 3 - hydroxymercuripropylcarbamyl] - anhydro - acid____g__ 10
Theophyllin ethylenediamine_____g__ 7.2
Trisodium phosphate dodecahydrate_____g__ 1
Water, q. s_____cc__ 100

The solution is placed in ampoules and sterilized. The sterilized solution can be administered subcutaneously without pain or induration at the injection site.

The above compositions employing o - [N - 2 - (β-methoxyethoxy) - 3 - hydroxymercuripropylcarbamyl]-phenoxyacetic anhydro-acid and its salts are given as illustrative only, but the other substituted phenoxyacetic anhydro-acids described herein and their salts can be used in such compositions and as will be obvious to those skilled in the art, many modifications of those illustrative compositions can be made.

I claim:

1. A compound selected from the group consisting of anhydro-acids represented by the formula

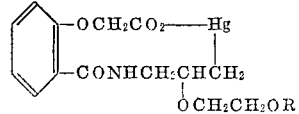

wherein R represents a member of the group consisting of hydrogen and lower alkyl radicals, and salts thereof.

2. A compound represented by the formula

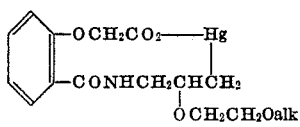

wherein alk represents a lower alkyl radical.

3. o - [N - 2 - (β - methoxyethoxy) - 3 - hydroxymercuripropylcarbamyl] - phenoxyacetic anhydro-acid represented by the formula

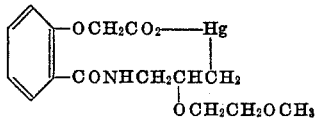

4. o - [N - 2 - (β - hydroxyethoxy) - 3 - hydroxymercuripropylcarbamyl] - phenoxyacetic anhydro-acid represented by the formula

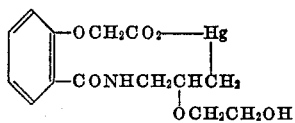

5. o - [N - 2 - (β - ethoxyethoxy) - 3 - hydroxymercuripropylcarbamyl] - phenoxyacetic anhydro - acid represented by the formula

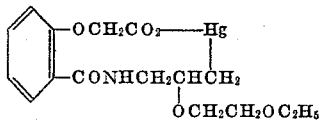

6. o- [N - 2 - (β-butoxyethoxy) - 3 - hydroxymercuripropylcarbamyl] - phenoxyacetic anhydro - acid represented by the formula

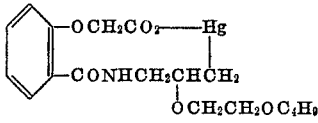

7. o - [N - 2 - (β - 2' - ethylbutoxyethoxy) - 3 - hydroxymercuripropylcarbamyl] - phenoxyacetic anhydroacid represented by the formula

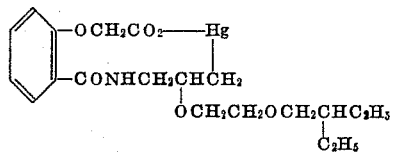

No references cited.